(12) United States Patent
Lee et al.

(10) Patent No.: US 9,870,110 B2
(45) Date of Patent: Jan. 16, 2018

(54) SELF-CAPACITANCE INPUT DEVICE WITH HOVERING TOUCH

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 61 days.

(21) Appl. No.: 14/971,511

(22) Filed: Dec. 16, 2015

(65) Prior Publication Data

US 2016/0179251 A1 Jun. 23, 2016

(30) Foreign Application Priority Data

Dec. 17, 2014 (TW) .............................. 103144063 A

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01)

(58) Field of Classification Search
CPC .......... G06K 9/00; H01L 23/12; H03K 17/96; H05K 1/02; G06F 21/32; G06F 3/045; G06F 3/041; G01R 27/26
See application file for complete search history.

(56) References Cited

U.S. PATENT DOCUMENTS

| | | | | |
|---|---|---|---|---|
| 2003/0099380 A1* | 5/2003 | Gozzini | ............... | G06K 9/0002 382/124 |
| 2008/0069413 A1* | 3/2008 | Riedijk | ............... | G06K 9/0002 382/124 |
| 2010/0084542 A1* | 4/2010 | Chou | ......................... | H03F 3/08 250/214 A |
| 2011/0254571 A1* | 10/2011 | Togura | .................... | G01D 5/24 324/679 |
| 2013/0314342 A1* | 11/2013 | Kim | ........................ | G06F 3/041 345/173 |
| 2014/0152621 A1* | 6/2014 | Okayama | ............... | G06F 3/0416 345/174 |

* cited by examiner

*Primary Examiner* — Pegeman Karimi
(74) *Attorney, Agent, or Firm* — Muncy, Geissler, Olds & Lowe, P.C.

(57) ABSTRACT

A self-capacitance input device with hovering touch includes a sensing electrode layer, a reflection and deflection electrode layer, an insulation layer, and an amplifier with a gain greater than zero. The sensing electrode layer has a plurality of sensing electrodes on one side for sensing a touch or approach of an external object. The reflection and deflection electrode layer is disposed on the other side of the sensing electrode layer and has at least one reflection and deflection electrode. The insulation layer is disposed between the sensing electrode layer and the reflection and deflection electrode layer. The amplifier has an output coupled to the reflection and deflection electrode layer.

6 Claims, 12 Drawing Sheets

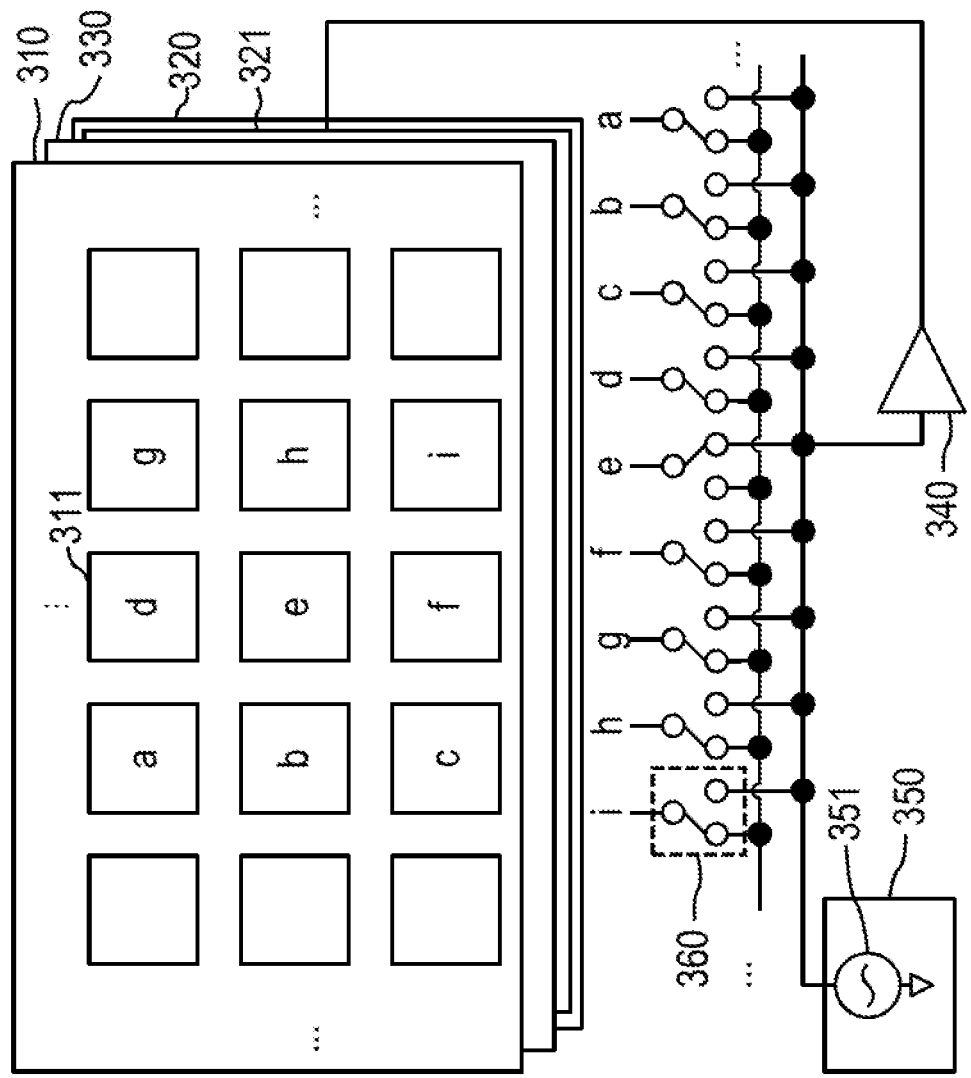

SELF-CAPACITANCE INPUT DEVICE WITH HOVERING TOUCH

BACKGROUND OF THE INVENTION

1. Field of the Invention

The present invention relates to the technical of touch panels and, more particularly, to a self-capacitance input device with hovering touch.

2. Description of Related Art

With rapid spread of smart phones and tablet computers that enables touch input and multi finger gesture operation to be popular, the requirement of hovering gesture operations is then getting more and more important. Hovering detectors are already used in various smart phones to give an added value to the smart phones. The hovering detectors can detect approaching, leaving, position, and moving direction of an object without having to come into touch with the object. However, the hovering gesture detectors on the market mostly use optical photographic or infrared scanning modes, which are likely to encounter the problems of hand shadow, ambient light interference, and power consumption, resulting in disadvantage to the applications of a mobile device.

A projected capacitive touch control has the advantages of power saving, long lifetime, compact mechanism, and simple product design, and this is especially suitable for the applications of mobile electronic devices. The capacitance detection scheme for the projected capacitive touch panel can be divided into self-capacitance and mutual-capacitance sensing types. FIG. 1 is a typical self-capacitance sensing system, in which one conductor line is concurrently connected to the driving and sensing units 110, 120 in order to first drive the conductor line and then sense the change of a signal on the conductor line thereby determining the magnitude of self-capacitance.

Another method of driving the capacitive touch panel is to sense a magnitude change of mutual capacitance Cm so as to determine whether there is an object approaching to the touch panel. Similarly, instead of being a physical capacitance, the mutual capacitance Cm is a capacitance produced between two conductors arranged in first and second directions. FIG. 2 is a schematic diagram of a typical mutual-capacitance sensing system. As shown in FIG. 2, the drivers 210 are disposed in the first direction (Y), and the sensors 220 are disposed in the second direction (X). At the upper half of a first period T1, the drivers 210 drive the conductor lines 230 in the first direction and use the voltage Vy_1 to charge the mutual capacitance (Cm) 250, and at the lower half of the first period T1, all sensors 220 sense voltages (Vo_1, Vo_2, . . . , Vo_n) on the conductor lines 240 in the second direction so as to obtain n data. Accordingly, m×n data can be obtained after m driving periods.

However, the prior projected capacitive touch panel is provided to achieve only the multi-touch detection, while being unable to perform hovering touch. Therefore, it is desirable to provide an improved input device with hovering touch to mitigate and/or obviate the aforementioned problems.

SUMMARY OF THE INVENTION

The object of the present invention is to provide a self-capacitance input device with hovering touch, which can realize the hovering detection technology in a projected capacitive touch input device.

In one aspect of the present invention, there is provided a self-capacitance input device with hovering touch, which comprises: a sensing electrode layer having a plurality of sensing electrodes on one side for sensing a touch or approach of an external object; a reflection and deflection electrode layer disposed on the other side of the sensing electrode layer and having at least one reflection and deflection electrode; an insulation layer disposed between the sensing electrode layer and the reflection and deflection electrode layer; and at least one amplifier with a gain greater than zero having an output coupled to the reflection and deflection electrode layer.

In another aspect of the present invention, there is provided a self-capacitance input device with hovering touch, which comprises: a sensing/deflection electrode layer having a plurality of sensing/deflection electrodes; a sensing control circuit having a touch sensing signal source; and a plurality of selection switch circuits corresponding to the plurality of sensing/deflection electrodes, respectively, for sending a touch sensing signal generated by the touch sensing signal source to the corresponding sensing/deflection electrodes selected sequentially, wherein the touch sensing signal of the selected sensing/deflection electrode is coupled to the sensing/deflection electrodes neighboring the selected sensing/deflection electrode through the at least one amplifier and the selection switch circuits thereby performing a touch sensing or hovering detection.

In still another aspect of the present invention, there is provided a self-capacitance input device with hovering touch, which comprises: a sensing/deflection electrode layer having a plurality of electrodes; a plurality of amplifiers each with a positive gain, wherein the gain of each amplifier is adjustable by programming; a sensing control circuit having a touch sensing signal source; and a plurality of selection switch circuits corresponding to the plurality of electrodes, respectively, for sending a touch sensing signal generated by the touch sensing signal source to the corresponding electrodes selected sequentially, wherein the touch sensing signal of the selected electrode is coupled to the electrodes surrounding the selected electrode through the amplifiers and selection switch circuits for performing a touch sensing or hovering detection.

Other objects, advantages, and novel features of the invention will become more apparent from the following detailed description when taken in conjunction with the accompanying drawings.

BRIEF DESCRIPTION OF THE DRAWINGS

FIG. 3A is a schematic diagram of a self-capacitance input device with hovering touch according to an embodiment of the present invention;

DETAILED DESCRIPTION OF THE PREFERRED EMBODIMENT

Figure 1:
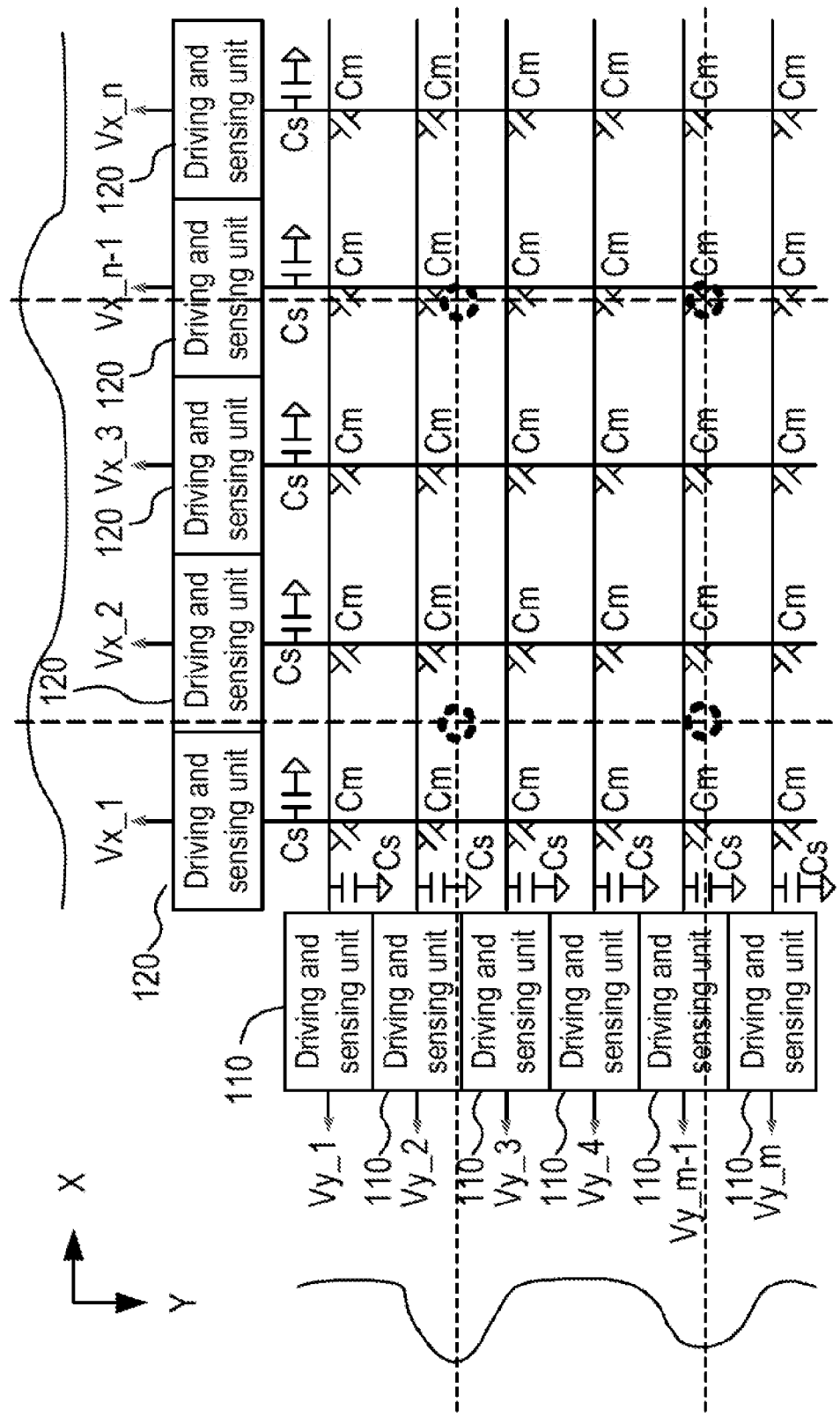
FIG. 1 is a schematic diagram of a typical self-capacitance sensing system.
Figure 2:
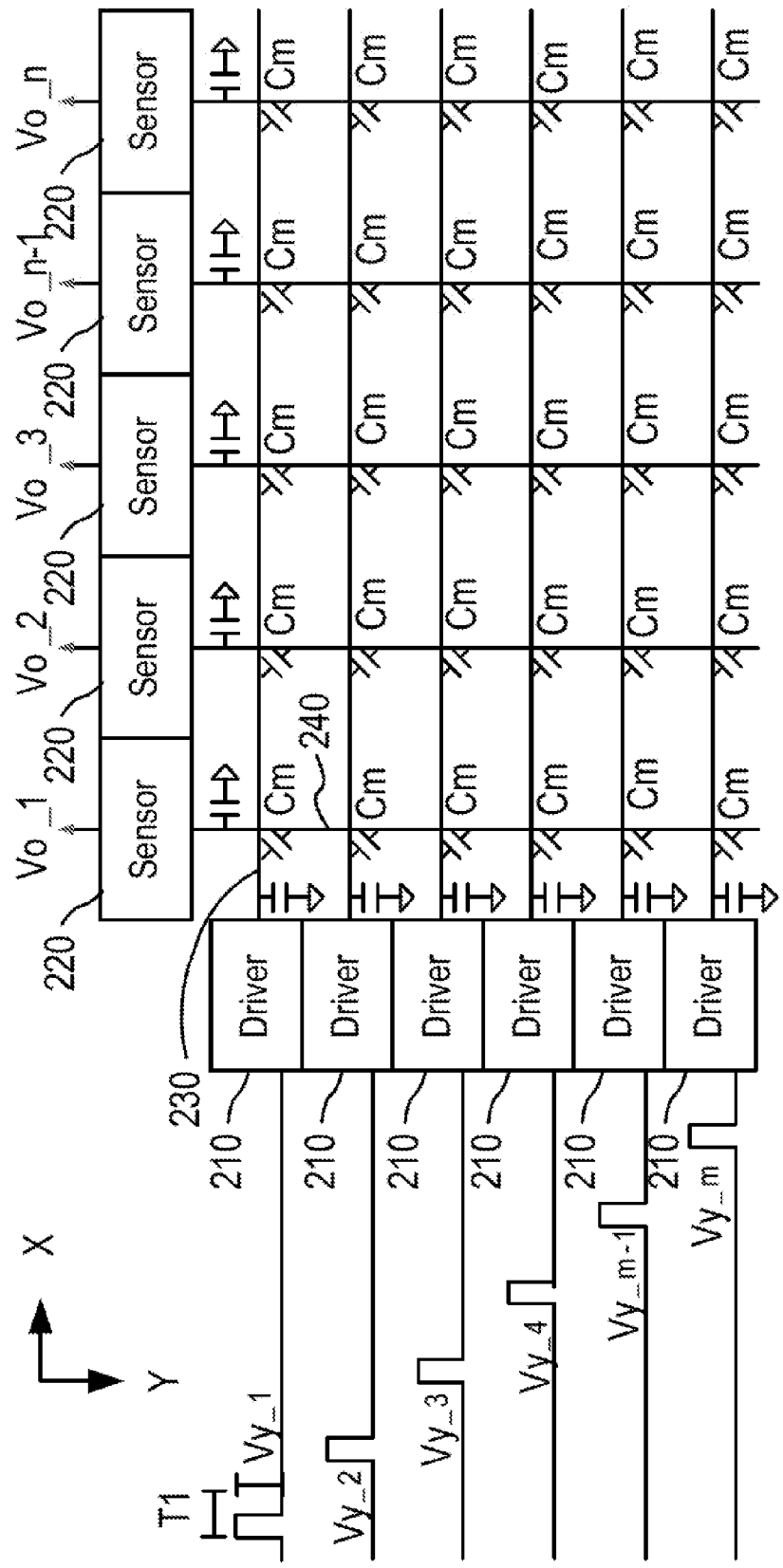
FIG. 2 is a schematic, diagram of a typical mutual-capacitance sensing system.

FIG. 3A is a schematic diagram of a self-capacitance input device 300 with hovering touch according to an embodiment of the present invention. The self-capacitance input device 300 includes a sensing electrode layer 310, a reflection and deflection electrode layer 320, an insulation layer 330, at least one amplifier 340 with a gain greater than zero, a sensing control circuit 350, and a plurality of selection switch circuits 360.

The sensing electrode layer 310 has a plurality of sensing electrodes 311 on one side for sensing a touch or approach of an external object. Each of the sensing electrodes 311 has a shape of polygon, circle, triangle, rectangle, diamond, star, pentagon, hexagon, octagon, wedge, radiation, or square.

Figure 3B:
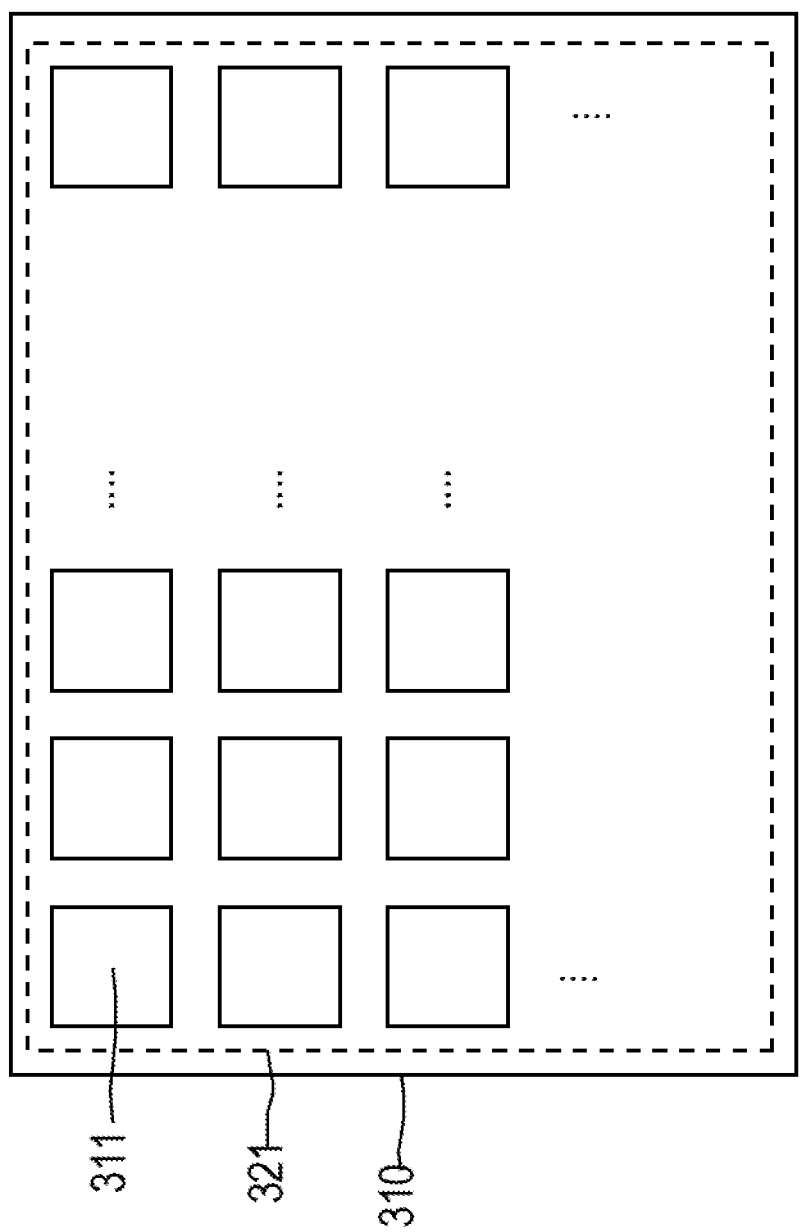
FIG. 3B schematically illustrates the position relation for a reflection and deflection layer and a sensing electrode layer of the self-capacitance input device with hovering touch according to the present invention.

The reflection and deflection electrode layer 320 is disposed on the other side of the sensing electrode layer 310, and has at least one reflection and deflection electrode 321. The area of the at least one reflection and deflection electrode 321 is greater than or equal to an area covered by the sensing electrodes 311. As shown in FIG. 3B, the reflection and deflection electrode layer 320 is disposed below the sensing electrode layer 310 and thus is indicated by a dotted line. The plurality of sensing electrodes 311 and the at least one reflection and deflection electrode 321 are made of conductive material selected from the group consisting of Cr, Ba, Al, Ag, Cu, Ti, Ni, Zn, Sn, Ta, Co, W, Mg, Ga, K, Li, In, Mo, alloy, ITO, IZO, ZnO, GZO, MG(OH)$_2$, conductive polymer, carbon nanotube, graphene, silver nanowire, LiF, MgF$_2$, and Li$_2$O.

The insulation layer 330 is disposed between the sensing electrode layer 310 and the reflection and deflection electrode layer 320.

The at least one amplifier 340 with a gain greater than zero has an output coupled to the reflection and deflection electrode 321 of the reflection and deflection electrode layer 320, The gain of the amplifier 340 with a gain greater than zero is adjustable.

The sensing control circuit 350 has a touch sensing signal source 351 for providing a sine wave, a triangle wave, a square wave or a trapezoid wave.

The plurality of selection switch circuits 360 are corresponding to the plurality of sensing electrodes 311, respectively. The plurality of selection switch circuits 360 sequentially send a touch sensing signal generated by the touch sensing signal source 351 to the corresponding sensing electrodes 311 for performing a touch sensing or hovering detection.

With the selection switch circuits 360, the touch sensing signal is also applied to the amplifier 340 with a gain greater than zero for being amplified and subsequently sent to the reflection and deflection electrode layer 320. As shown in FIG. 3A, a selection switch circuit 360 having one end connected to a symbol i represents that the end is connected to a sensing electrode i.

FIGS. 4A to 4D, 5A to 5C, and 6 schematically illustrate the operation principle of the self-capacitance input device 30 with hovering touch according to the present invention.

Figure 4A:
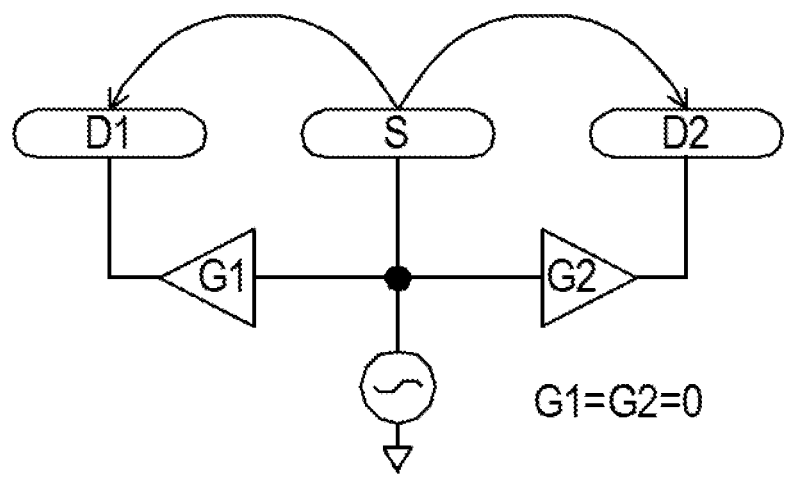
FIGS. 4A to 4D, 5A to 5C, and 6 schematically illustrate the operation principle of the self-capacitance input device with hovering touch according to the present invention.
Figure 4B:
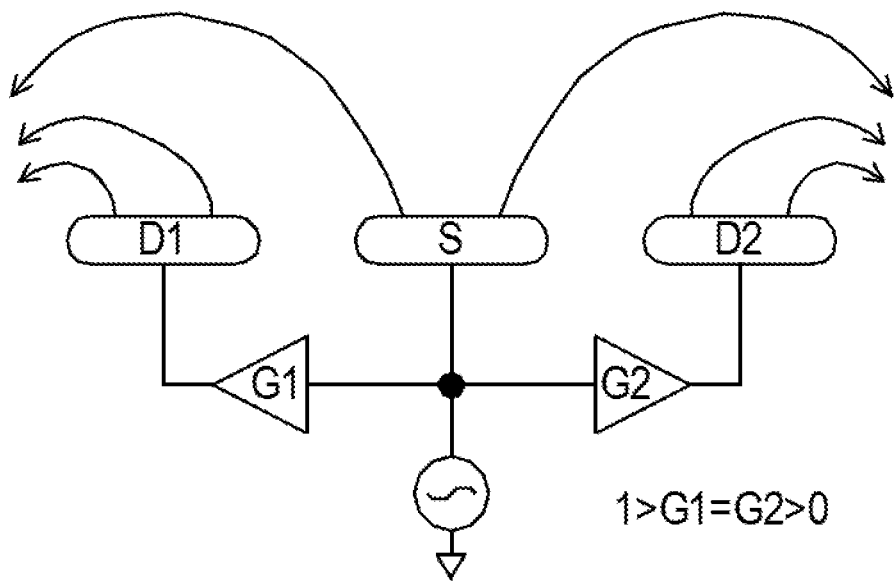
Figure 4C:
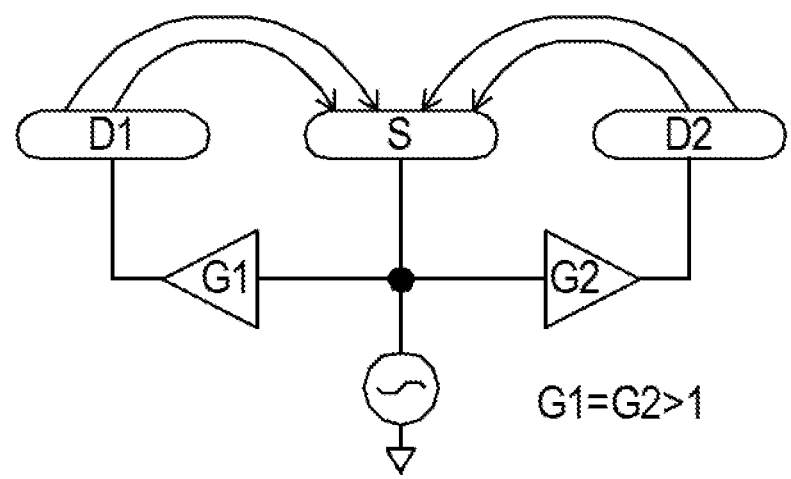
Figure 4D:
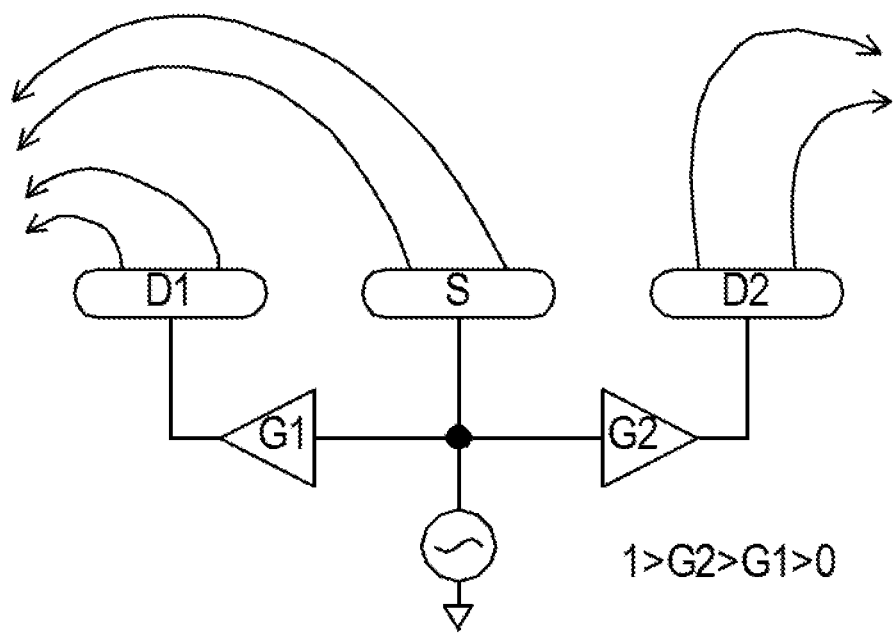

As shown in FIG. 4A, when there is a touch sensing signal on the sensing electrode S and there is no touch sensing signal on the sensing electrodes D1, D2, the electric flux lines are irradiated from the sensing electrode S to the sensing electrodes D1, D2. As shown in FIG. 4B, when the sensing electrode S is provided with touch sensing signal, and sensing electrodes D1 and D2 are provided with touch sensing signal having the same polarity as that on the sensing electrode S, due to the mutual repulsion principle between like charges, the electric flux lines originated from the sensing electrode S are extended farther due to the repulsion of the electric flux lines originated from the sensing electrodes D1, D2. As shown in FIG. 4C, when the sensing electrode S is provided with touch sensing signal and the sensing electrodes D1, D2 are provided with greater touch sensing signal than that on the sensing electrode S, the electric flux lines are irradiated from the sensing electrodes D1, D2 to the sensing electrode S. As shown in FIG. 4D, when the sensing electrode S is provided with touch sensing signal, and the sensing electrodes D1, D2 are provided with same-polarity and smaller touch sensing signal in comparison with that on the sensing electrode S in which the touch sensing signal on the sensing electrode D1 is smaller than that on the sensing electrode D2, the electric flux lines originated from the sensing electrodes S, D1, D2 are irradiated outward, and the electric flux lines are pushed by the touch sensing signal of the sensing electrode D2 and thus deflected toward the sensing electrode D1, so that the electric flux lines originated from the sensing electrode S are deflected and extended over the sensing electrode D1.

Figure 5A:
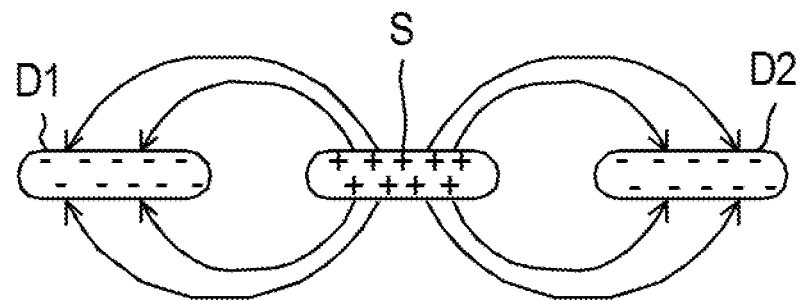
Figure 5B:
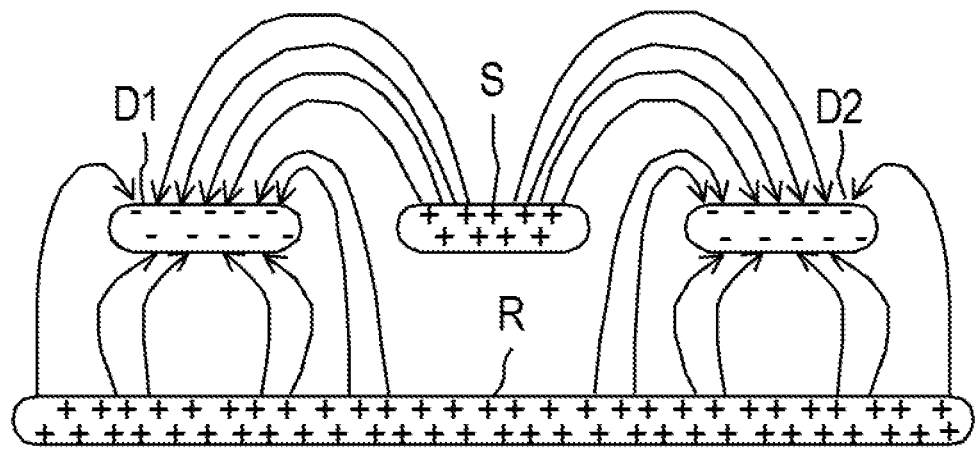
Figure 5C:
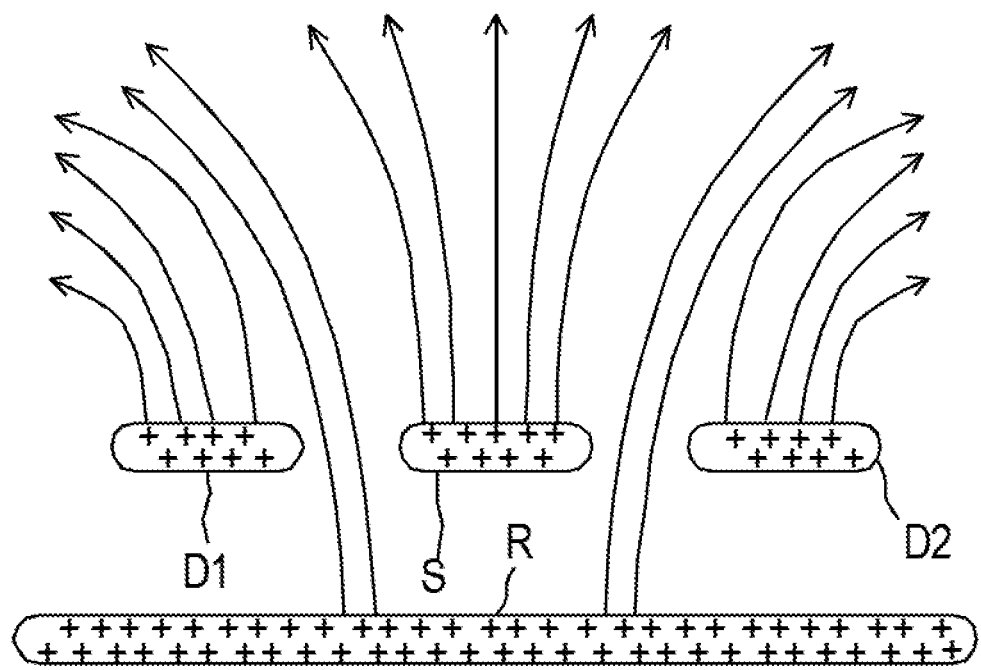

As shown in FIG. 5A, when there is a positive-polarity touch sensing signal on the sensing electrode S and there is no touch sensing signal on the sensing electrodes D1, D2, it is equivalent to that the sensing electrode S is provided with positive charge and the sensing electrodes D1, D2 are correspondingly provided with negative charge, so that the electric flux lines are irradiated from the sensing electrode S to the sensing electrodes D1, D2. As shown in FIG. 5B, when there is a positive-polarity touch sensing signal on the sensing electrode S and the reflection and deflection electrode R, and there is no touch sensing signal on the sensing electrodes D1, D2, it is equivalent to that the sensing electrode S and the reflection and deflection electrode R are provided with positive charge, and the sensing electrodes D1, D2 are correspondingly provided with negative charge, so that the electric flux lines are irradiated from the sensing electrode S and the reflection and deflection electrode R to the sensing electrodes D1, D2. At this moment, the electric flux lines irradiated from the sensing electrode S to the sensing electrodes D1, D2 are repulsed by the same-polarity electrical field of the reflection and deflection electrode R, thereby being upwardly irradiated out and pushed higher so as to enlarge the sensing range. As shown in FIG. 5C, when there is positive-polarity touch sensing signal on the sensing electrode S, the reflection and deflection electrode R and the sensing electrodes D1, D2, it is equivalent to that the sensing electrode 5, the reflection and deflection electrode R and the sensing electrodes D1, D2 are provided with positive charge, so that the electric flux lines originated from the sensing electrode S, the reflection and deflection electrode R and the sensing electrodes D1, D2 are upwardly irradiated out. At this moment, the electric flux lines originated from the sensing electrode S are pushed due to the repulsion and thus are extended higher than those in FIG. 5B, so that the sensing range becomes larger. Similarly, the same analysis can be applied with electric flux lines in opposite direction when there is negative-polarity touch sensing signal on the sensing electrode S, the reflection and deflection electrode R and the sensing electrodes D1, D2.

Figure 6:
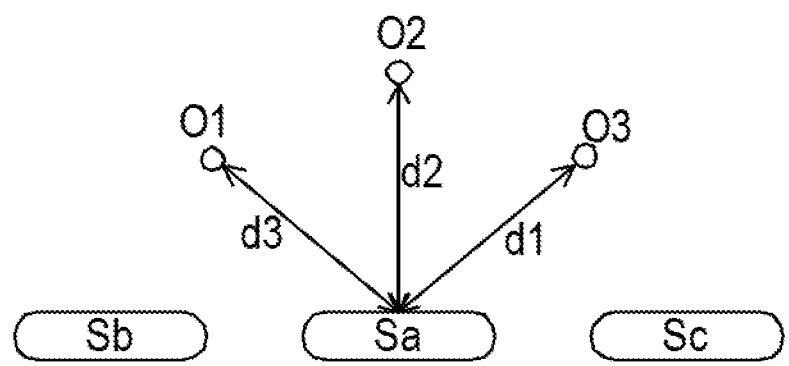

As shown in FIG. 6, the distances between the sensing electrode Sa and the positions O1, O2 and O3 are equal, i.e., d1=d2=de. When an object is disposed on the position O1, O2, or O3, the sensing signal sensed by the sensing electrode Sa is the same, so that the sensing, electrode Sa cannot determine the position of the object. However, referring to FIG. 4D, it is known that, when the sensing electrodes Sb, Sc neighboring the sensing electrode Sa are applied with touch sensing signals with the same polarity but different magnitudes, electric flux lines are deflected and distributed in different manners, and thus the position of the object can be determined based on the sensing signal of the sensing electrode Sa.

Referring to FIG. 3A and FIG 5B, with the selection switch circuits 360, when the touch sensing signal is applied to the at least one amplifier 340 with a gain greater than zero for being amplified and then sent to the reflection and deflection electrode layer 320, the electric flux lines on the sensing electrode e are pushed upwardly so as to enlarge the sensing range thereby allowing the hovering touch to be performed.

Figure 7:
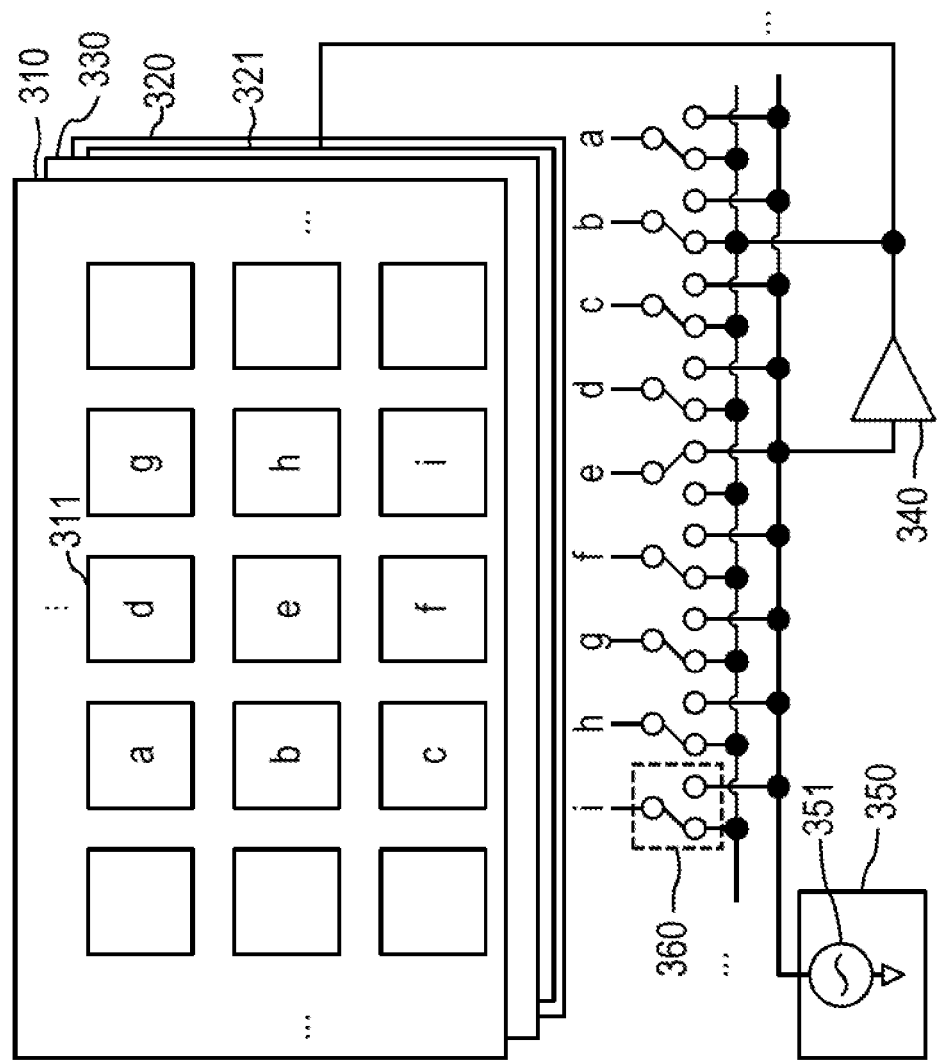
FIG. 7 is a schematic diagram of a self-capacitance input device with hovering touch according to another embodiment of the present invention.

FIG. 7 is a schematic diagram of a self-capacitance input device 700 with hovering touch according to another embodiment of the present invention. This embodiment is similar to that of FIG. 3A except that, with the selection switch circuits 360, the touch sensing signal is applied to the at least one amplifier 340 with a gain greater than zero for being amplified and subsequently sent to the sensing electrodes a, b, c, d, f, g, h, i neighboring the sensing electrode e. The operation principle is the same as that shown in FIG. 5C, in which the electric flux lines on the sensing electrode e are upwardly pushed again, so as to enlarge the sensing range for performing the hovering touch. In this embodiment, the gain of the amplifier 340 with a gain greater than zero is preferably one.

Figure 8:
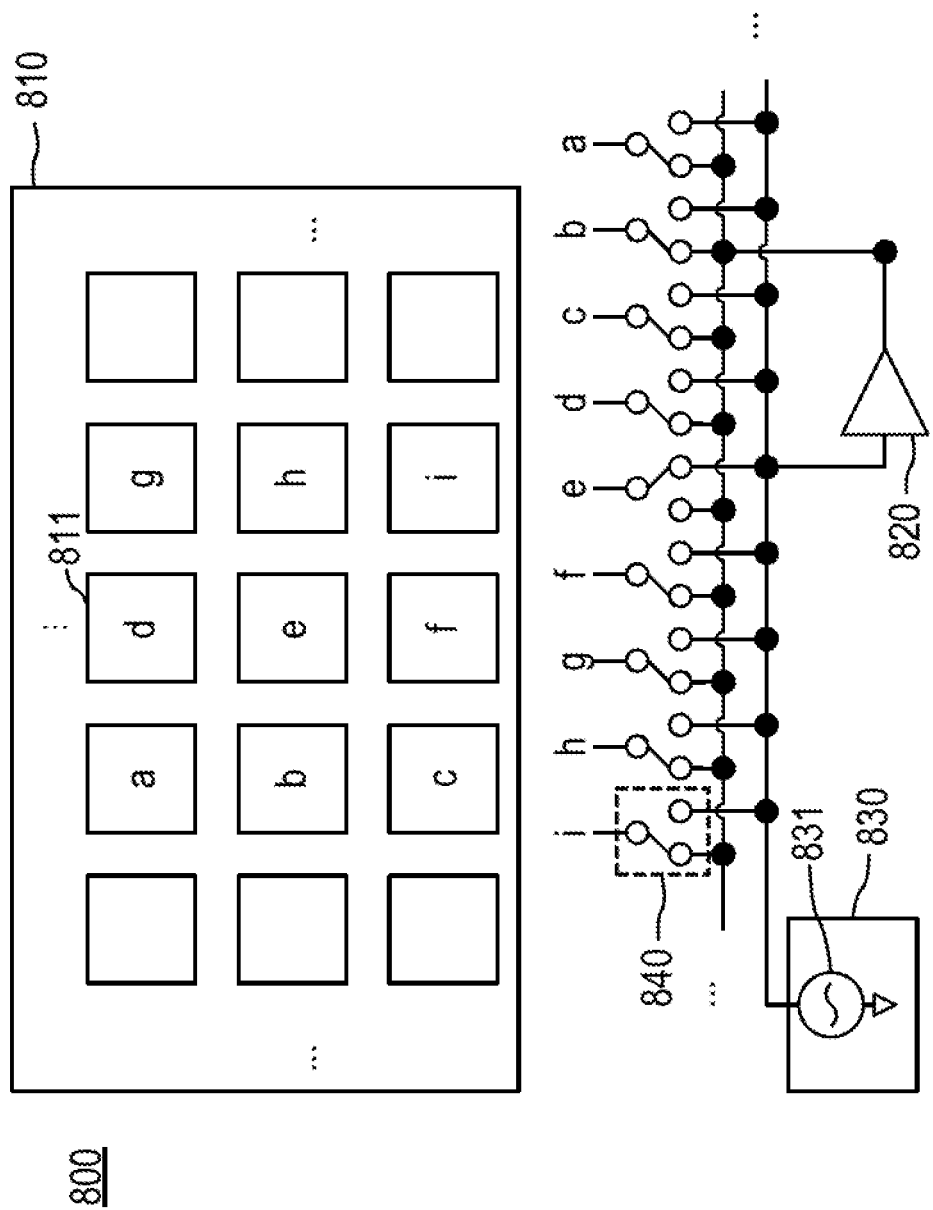
FIG. 8 is a schematic diagram of a self-capacitance input device with hovering touch according to still another embodiment of the present invention.

FIG. 8 is a schematic diagram of a self-capacitance input device 800 with hovering touch according to still another embodiment of the present invention. The self-capacitance input device 800 includes a sensing/deflection electrode layer 810, at least one amplifier $20 with a gain greater than zero, a sensing control circuit 830, and a plurality of selection switch circuits 840.

The sensing/deflection electrode layer 810 has a plurality of sensing/deflection electrodes 811. The sensing control circuit 830 has a touch sensing signal source 831. The plurality of selection switch circuits 840 are corresponding to the plurality of sensing/deflection electrodes 811, respectively. The plurality of selection switch circuits 840 sequentially send a touch sensing signal generated by the touch sensing signal source 831 to the corresponding sensing/deflection electrodes 811 for performing a touch sensing or hovering detection.

This embodiment is similar to that of FIG. 7 except that the reflection and deflection electrode layer 320 and the insulation 330 in FIG. 7 are removed. As shown in FIG. 8 and FIG. 4B, with the selection switch circuits 840, the touch sensing signal is applied to the at least one amplifier 820 with a gain greater than zero for being amplified, and subsequently sent to the sensing/deflection electrodes a, b, c, d, f, g, h, i neighboring a sensing/deflection electrode 840 under detection (the sensing/deflection electrode e). Therefore, the electric flux lines on the sensing/deflection electrode e are upwardly pushed, so as to enlarge the sensing range for performing the hovering touch.

Figure 9:
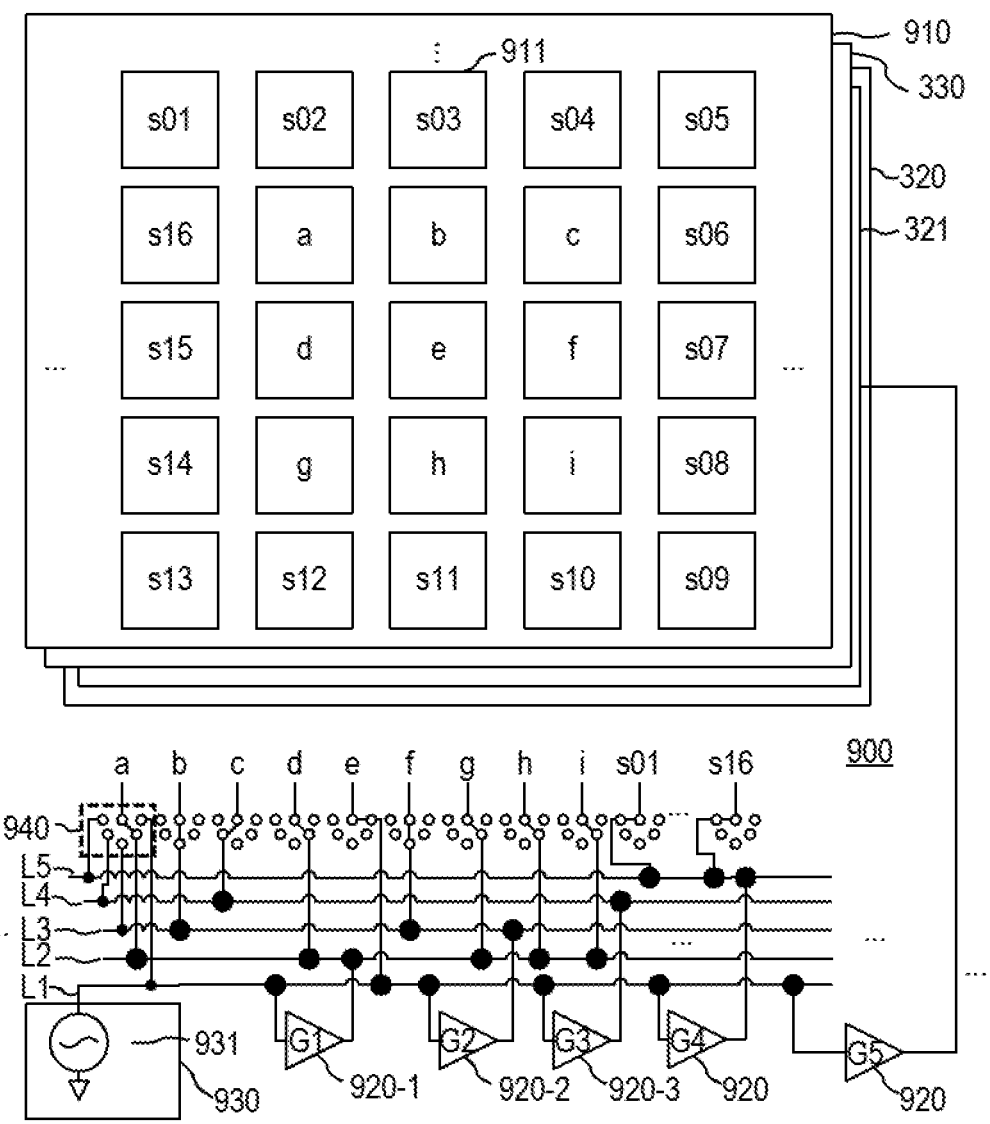
FIG. 9 is a schematic diagram of a self-capacitance input device with hovering touch according to yet another embodiment of the present invention.

FIG. 9 is a schematic diagram of a self-capacitance input device 900 with hovering touch according to yet another embodiment of the present invention. The self-capacitance input device 900 includes a sensing/deflection electrode layer 910, a plurality of amplifiers 920 each with a gain greater than zero, a sensing control circuit 930, a plurality of selection switch circuits 940, a reflection and deflection electrode layer 320, and an insulation layer 330.

The sensing/deflection electrode layer 910 has a plurality of electrodes 911. The gain of each simplifier 920 with a gain greater than zero is adjustable by programming. The sensing control circuit. 930 has a touch sensing signal source 931. The plurality of selection switch circuits 940 are corresponding to the plurality of electrodes 911, respectively. The plurality of selection switch circuits 940 sequentially send a touch sensing signal generated by the touch sensing signal source 931 to the corresponding electrodes 911 for performing a touch sensing or hovering detection.

With the selection switch circuits 940, the touch sensing signal is applied to the amplifiers 920 each with a gain greater than zero, respectively, for being amplified and subsequently sent to the electrodes neighboring an electrode e under detection, such that the neighboring electrodes a, b, c, d, f, g, h, i, s01, s02, . . . , s16 become the deflection electrodes for the electrode e.

Furthermore, the gains of the amplifiers 920 each with a gain greater than zero corresponding to the electrodes a, b, c, d, f, g, h, i, s01, s02, . . . , s16 are sequentially changed to enable the electric flux lines above the electrode e to be deflected and condensed in a specific direction, and sequentially read the sensing values of the electrode e corresponding to the electrodes a, b, c, d, f, g, h, i, s01, s02, . . . , s16, so as to compare the sensing values for determining a relative position and direction of an approaching object in hovering.

As shown in FIG. 9, the connection between each of the plurality of selection switch circuits 940 and the first to fifth connection lines L1, L2, . . . , L5 is the same as the connection between the selection switch circuit 940 corresponding to the electrode a and the first to fifth connection lines L1, L2, . . . L5. For keeping FIG. 9 to be clean, only the connection points for the electrodes corresponding to the other selection switch circuits 940 to the first to fifth connection lines L1, L2, . . . , L5 are illustrated.

Figure 10:
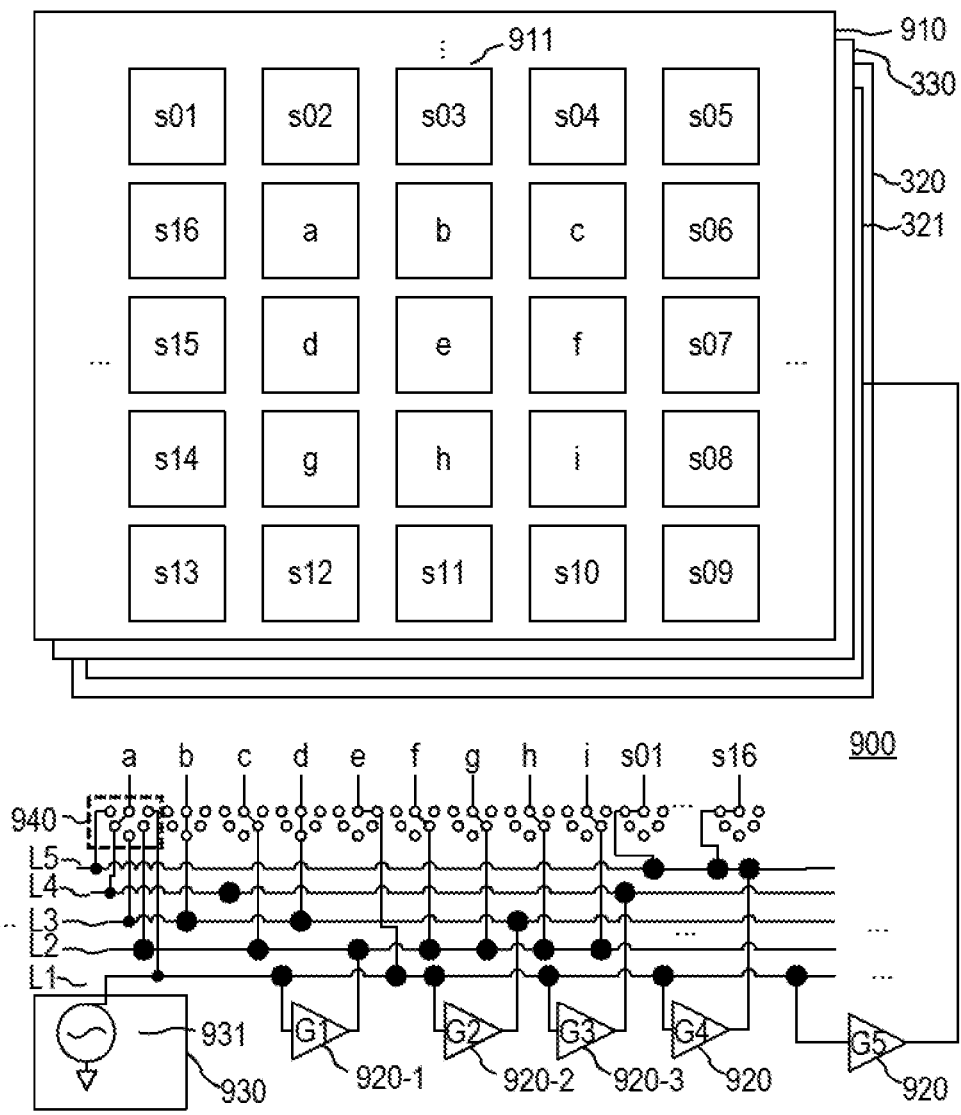
FIG. 10 is another schematic view illustrating that electric flux lines of the self-capacitance input device with hovering touch are deflected and condensed in a specific direction according to the present invention.

As shown in FIG. 9 and FIG. 4D, when the gain G1 of the amplifier 920-1 is greater than the gain G2 of the amplifier 920-2 and the gain G2 is greater than the gain G3 of the amplifier 920-3, the electric flux lines on the electrodes a, d, g, h, i connecting the second connection line L2 are deflected toward the electrode c, so that the electrode c has a higher density of the electric flux lines. FIG. 10 is another schematic view illustrating that the electric flux lines of the self-capacitance input device 900 with hovering touch are deflected and condensed in a specific direction according to the present invention. As shown in FIG. 10, the electrode a is connected to the fourth connection line L4, the electrodes b, d are connected to the third connection line L3, and the electrodes g, h, i, f, c are connected to the second connection line L2. When the gain G1 of the amplifier 920-1 is greater than the gain G2 of the amplifier 920-2 and the gain G2 is greater than the gain G3 of the amplifier 920-3, the electric flux lines on the electrodes g, h, i, f, c are deflected toward the electrode a, so that the electrode a has a higher density of the electric flux lines. Then, the gains of the plurality of amplifiers 920 each with a gain greater than zero and the plurality of selection switch circuits 940 are sequentially changed to enable the electric flux lines above the electrode e to be sequentially deflected and condensed in a specific direction, and the sensing values of the electrode e are sequentially read for comparison, thereby determining a relative position and direction of an approaching object in hovering.

In other embodiments, the reflection and deflection electrode layer 320 and the insulation layer 330 of the self-capacitance input device 900 can be eliminated, while the electric flux lines above the electrode e still can be deflected and condensed in a specific direction, thereby determining a relative position and direction of an approaching object in hovering.

In view of the foregoing, it is known that the present invention uses the reflection and deflection electrode 321 of the reflection and deflection electrode layer 320 to condense the electric flux lines of a sensing electrode e in a detection direction and extend the electric flux lines far away along the direction so as to enlarge the sensing range for performing the hovering touch, or increases charges of the sensing electrodes neighboring the sensing electrode e to further enlarge the sensing range for performing the hovering touch. Accordingly, the projected capacitive touch panel technology can be applied for the hovering touch.

Although the present invention has been explained in relation to its preferred embodiment, it is to be understood that many other possible modifications and variations can be made without departing from the spirit and scope of the invention as hereinafter claimed.

What is claimed is:

1. A self-capacitance input device with hovering touch, comprising:
    a sensing electrode layer having a plurality of sensing electrodes on one side for sensing a touch or approach of an external object;
    a reflection and deflection electrode layer disposed on the other side of the sensing electrode layer and having at least one reflection and deflection electrode;
    an insulation layer disposed between the sensing electrode layer and the reflection and deflection electrode layer;
    at least one amplifier with a gain greater than zero having an output coupled to the reflection and deflection electrode layer;
    a sensing control circuit having a touch sensing signal source; and
    a plurality of selection switch circuits corresponding to the plurality of sensing electrodes, respectively, for sequentially sending a touch sensing signal generated by the touch sensing signal source to the corresponding sensing electrodes thereby performing a touch sensing or hovering detection,
    wherein the at least one reflection and deflection electrode has an area greater than or equal to an area covered by the plurality of sensing electrodes,
    wherein, with the plurality of selection switch circuits, the touch sensing signal is applied to the at least one amplifier for being amplified and subsequently sent to the sensing electrodes neighboring a sensing electrode under detection.

2. The self-capacitance input device with hovering touch as claimed in claim 1, wherein, with the plurality of selection switch circuits, the touch sensing signal is applied to the at least one amplifier for being amplified and subsequently sent to the reflection and deflection electrode of the reflection and deflection electrode layer.

3. The self-capacitance input device with hovering touch as claimed in claim 1, wherein each of the sensing electrodes has a shape of a polygon, circle, triangle, rectangle, diamond, star, pentagon, hexagon, octagon, wedge, radiation, or square.

4. The self-capacitance input device with hovering touch as claimed in claim 3, wherein the plurality of sensing electrodes and the at least one reflection and deflection electrode are made of conductive material.

5. The self-capacitance input device with hovering touch as claimed in claim 4, wherein the conductive material is selected from the group consisting of Cr, Ba, Al, Ag, Cu, Ti, Ni, Zn, Sn, Ta, Co, W, Mg, Ca, K, Li, In, Mo, alloy, ITO, IZO, ZnO, GZO, MG(OH)2, conductive polymer, carbon nanotube, graphene, silver nanowire, LiF, MgF2, and Li2O.

6. The self-capacitance input device with hovering touch as claimed in claim 1, wherein the gain of the at least one amplifier is adjustable.

* * * * *